United States Patent [19]

Marsden

[11] 4,054,854

[45] Oct. 18, 1977

[54] VALVE OPERATOR

[75] Inventor: John Thomas Marsden, Stoke-on-Trent, England

[73] Assignee: Expert Industrial Controls Ltd., Ashby de la Zouch, England

[21] Appl. No.: 564,024

[22] Filed: Apr. 1, 1975

[30] Foreign Application Priority Data

Apr. 4, 1974 United Kingdom ............ 14916/74

[51] Int. Cl.² .................... H01F 3/10; H01F 7/16
[52] U.S. Cl. ............................ 335/260; 335/255
[58] Field of Search ............ 335/251, 255, 260, 261, 335/262

[56] References Cited

U.S. PATENT DOCUMENTS

| | | | |
|---|---|---|---|
| 2,651,744 | 9/1953 | Acklin et al. | 335/262 X |
| 3,166,692 | 1/1965 | Forrester et al. | 335/251 |
| 3,262,027 | 7/1966 | Zaleske | 335/261 |
| 3,378,732 | 4/1968 | Dietz et al. | 335/251 X |
| 3,727,160 | 4/1973 | Churchill | 335/251 |
| 3,757,263 | 9/1973 | Saarem et al. | 335/262 X |

*Primary Examiner*—Harold Broome
*Attorney, Agent, or Firm*—Kane, Dalsimer, Kane, Sullivan & Kurucz

[57] ABSTRACT

A valve operator comprises a pole piece formed from magnetizable material, a hollow intermediate member formed from non-magnetic material the intermediate member being secured to the pole piece in a fluid pressure proof manner and a further hollow member secured to the intermediate member again in a pressure proof manner. The hollow members contain an armature and the end of the further member is sealed to completely enclose the armature.

24 Claims, 4 Drawing Figures

VALVE OPERATOR

This invention relates to valve operators of the electromagnetic type and of the kind which are adapted to be mounted on a casing of a fluid control valve, the operator including an armature housed within a fluid pressure proof compartment.

The object of the invention is to provide such an operator in a simple and convenient form.

According to the invention, a valve operator of the kind specified comprises a pole piece formed from magnetisable material, a hollow intermediate member formed from non-magnetic material, said intermediate member being secured in a fluid pressure proof manner to the pole piece, a further hollow member secured to said intermediate member at its end remote from the pole piece, said further member being formed of maagnetisable material and secured to the intermediate member in a pressure proof manner, an end closure for the further hollow member, said pole piece and said members defining said fluid pressure proof compartment, means whereby the pole piece can be secured to a fluid control valve, and a magnetising structure detachably mounted about the pressure proof compartment, said magnetising a structure including an electric winding and the structure being arranged so that when the winding is supplied with electric current, said pole piece and the further member will be magnetically polarised, the armature moving under the influence of the magnetic field towards the pole piece.

Two examples of valve operators in accordance with the invention, will now be described with reference to the accompanying drawings in which.

Figure 1:
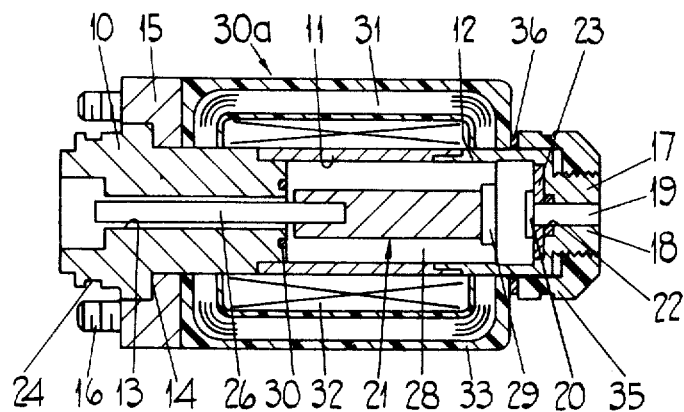
FIG. 1 is a sectional side elevation of one example of an operator.
Figures 2, 3:
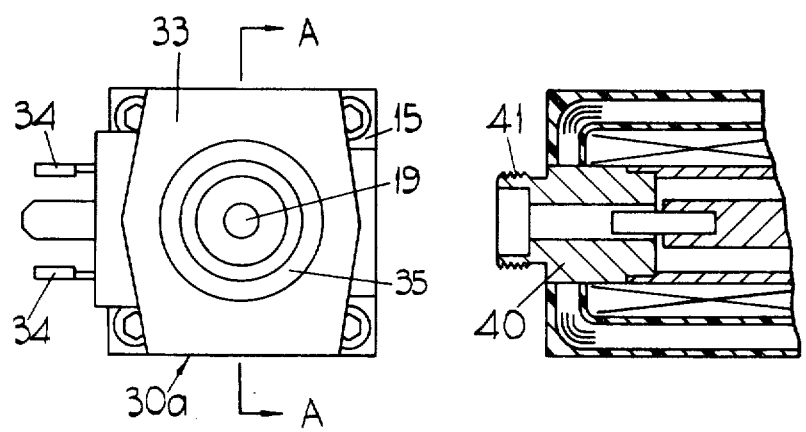
FIG. 2 is an end view of the operator shown in FIG. 1.
FIG. 3 shows a sectional side elevation of a modified form of the operator shown in FIG. 1.
Figure 4:
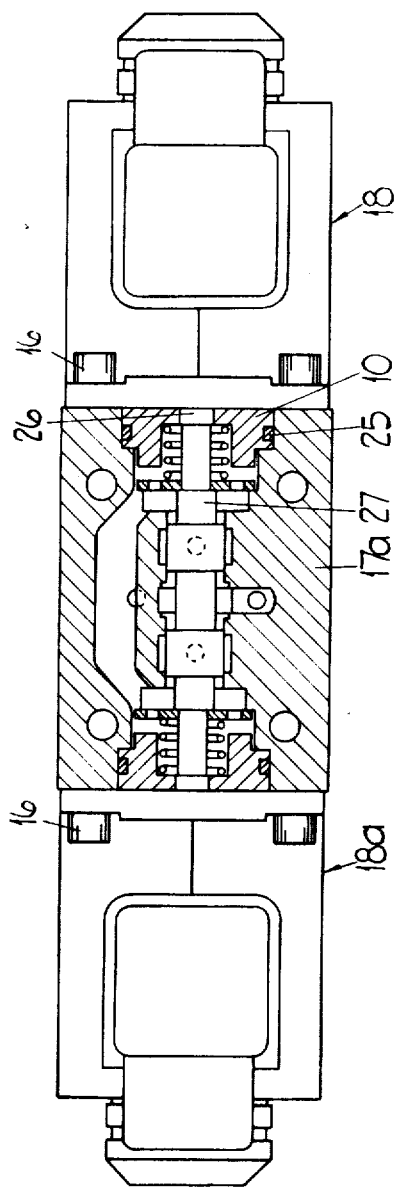
FIG. 4 shows how a pair of valve operators of the type shown in FIG. 1, can be mounted on a fluid control valve.

Referring to FIGS. 1 and 2 of the drawings, the valve operator comprises a fluid pressure proof compartment which is constituted by a pole piece 10, a hollow intermediate member 11 and a further hollow member 12. The pole piece is formed from magnetisable material and has a stepped external peripheral surface and extending axially within the pole piece is a bore 13. A first step 14 on the periphery of the pole piece serves as a location for a clamping plate 15 which is provided with apertures through which extend threaded bolts 16 which engage within complimentarily threaded apertures in the body of the valve 17a which is seen in FIG. 4, the operators being indicated at 18a. In addition, the pole piece is provided with a further step about which is engaged the hollow member 11. This is formed from stainless steel, which for all practical purposes, can be regarded as a non-magnetic material. The member 11 and the pole piece are secured together as by brazing or welding. The further hollow member 12 and the member 11 are secured together in a similar fashion, and conveniently the member 12 has a portion of reduced diameter which engages within a portion of enlarged diameter of the member 11. Moreover, the member 12 is provided with an integral end closure 17. This is provided with an extension 18, the periphery of which is provided with a screw thread, and formed in the extension is a bore in which is located a manually operable rod 19 having a head 20 positioned for engagement with an armature 21 which is located within the members 11 and 12. A seal member 22 is provided within a recess defined about the bore containing the rod 19, and the seal member is retained in position by a non-magnetic washer 23 conveniently formed from stainless steel. This washer also acts to prevent magnetic stiction, when the operator is used with a d.c. supply. Conveniently, the pole piece and the further hollow member 12 are formed from silicon steel.

At its end remote from the members 11 and 12, the pole piece is provided with a peripheral groove 24 which as shown in FIG. 4, accommodates a seal member 25, and located within the bore 13 in the pole piece is a push rod 26 which is engageable with the end of a valve member 27 forming part of the fluid control valve. The push rod 26 is secured relative to the armature 21, and the latter is placed in the compartment before the pole piece, the intermediate member and the further member are secured together.

The armature in the example shown is formed from a solid piece of magnetisable material, but is provided with axially extending slots 28. Moreover, the end face of the armature which is presented to the closure member is provided with a cylindrical recess 29 which acts to minimise the risk of the armature sticking to the washer 23. In addition, the end face of the pole piece presented to the armature is provided with a shading ring 30, and the adjacent end face of the armature is also slotted, again to minimise the risk of the armature sticking to the pole piece. Whilst the armature illustrated is slotted along its length to permit passage of fluid, it will be appreciated that the armature may be bored to achieve this object. Furthermore, instead of a slotted end face adjacent the pole piece the end face may be recessed.

The peripheral surface of the pressure proof compartment defined by the pole piece 10 and the members 11 and 12 is of plain cylindrical form, and engageable about this surface is a magnetising structure 30a.

The magnetising structure includes a rectangular core 31 which conveniently is formed from a strip of magnetisable material which is wound in spiral fashion. The end of the strip is secured conveniently by brazing or welding to the adjacent turn so as to prevent the strip iunwinding. Furthermore, in the end members of the core, there are provided apertures respectively, the apertures being circular in form and of a size to ensure that the magnetisable structure can slide over the pressure proof compartment. Within the core there is located an annular winding 32 which is supported by an insulating former. The former is of annular construction and again is of a size such that it can be slid over the pressure proof compartment. The former, together with the winding and the core are maintained in assembly by moulding them in a body 33 of synthetic resin material. Moreover, electrical connectors 34 are provided to the ends of the winding, and these are moulded into the body. The magnetising structure can be assembled over the pressurised compartment and can have any angular setting relative thereto. It should be noted however that the moulded body, as shown in the drawing, is provided with flat sides and preferably these are aligned with the flat sides of the mounting plate 15.

The body of the magnetising structure is retained in assembly over the pressurised compartment by means of a retaining member 35 which is engaged with the threaded portion of the extension 18. Moreover, a wave washer 36 is interposed between the body and the retaining member.

The dimensions of the core 31 are such that one end member lies about the pole piece 10, whilst the other end member lies about the further hollow member 12, and when the winding is supplied with electric current, the pole piece and the member 12 will be magnetically polarised to opposite polarity. The member 12 provides a low reluctance magnetic path with the armature, and if the armature is spaced from the pole piece, a force will be produced tending to draw the armature towards the end face of the pole piece.

The provision of the pressure proof compartment means, of course, that the compartment can be subjected to fluid pressure from the valve. Moreover, the vave described has the important advantage that, if for any reason it is desired to replace the winding, either because it has become faulty or because it is desired to operate the valve using a different voltage, it is a simple matter to unscrew the retaining member 35 and to change the magnetising structure. This can be achieved without the need to dismantle the operator from the valve. The fluid connections therefore of the valve and any associated equipment, do not have to be disturbed.

Turning now to FIG. 3, the valve operator shown therein is substantially identical with that which is seen in FIG. 1. However, it will be seen that the pole piece 40 instead of being provided with a peripheral flange, as in the example of FIG. 1, it is provided with an extension 41 having a peripheral screw thread whereby it can be secured within the casing of the valve.

The valve operator may be used with an a.c. or a d.c. supply and conveniently the design of the winding is such that it can be used with a 24v d.c. supply and a 110 volt 50 cycle a.c. supply. Clearly other supply voltages may be used by altering the design of the winding.

I claim:

1. A valve operator of the kind specified comprising a pole piece formed from magnetisable material, a hollow intermediate member formed from non-magnetic material, said intermediate member being secured in a fluid pressure proof manner to the pole piece, a further hollow member secured to said intermediate member at its end remote from the pole piece, said further member being formed of magnetisable material and secured to the intermediate member in a pressure proof manner, an end closure for the further hollow member, said pole piece and said members defining said fluid pressure proof compartment, an armature in said compartment, means whereby the pole piece can be secured to a fluid control valve, and a magnetising structure detachably mounted about the pressure proof compartment, said magnetising structure including an electric winding and the structure being arranged so that when the winding is supplied with electric current, said pole piece and the further member will be magnetically polarised establishing a magnetic field, the armature moving under the influence of the magnetic field towards the pole piece, said pole piece and said members defining a cylindrical outer surface, said magnetising structure being slidable over said surface and being angularly movable about said surface to a desired position, said magnetizing structure includes a rectangular core having apertures in its end members, said pressure proof compartment extending through said apertures so that the end members of the core are aligned with the pole piece and said further member respectively.

2. A valve operator as claimed in claim 1 including an annular winding disposed within said core, said pressure proof compartment extending through said winding.

3. A valve operator as claimed in claim 2 in which said core and said winding are moulded in a synthetic resin body.

4. A valve operator as claimed in claim 3 including electrical connector means for said winding, said connector means being moulded into said body.

5. A valve operator as claimed in claim 4 including retaining means carried by said further hollow member for retaining said body in assembly with the pressure proof compartment.

6. A valve operator as claimed in claim 5 in which said retaining means comprises a cap having screw thread engagement with a complementarily threaded portion of said further hollow member.

7. A valve operator as claimed in claim 1 in which said core comprises a spirally wound strip of material.

8. A valve operator as claimed in claim 1 including the hollow intermediate member and the further member being of hollow cylindrical form, the presented ends of the two members being complementarily stepped so as to interengage with each other, the two members being secured together as by brazing or welding, said pole piece defining a cylindrical portion about which is engaged said hollow intermediate member, said pole piece and said intermediate member being secured together as by brazing or welding, a step defined on said pole piece, said step being engageable by a clamping plate whereby the operator can be secured to the fluid control valve.

9. A valve operator as claimed in claim 1 in which the hollow intermediate member and the further member being of hollow cylindrical form, the presented ends of the two members being complementarily stepped so as to interengage with each other, the two members being secured together as by brazing or welding, said pole piece defining a cylindrical portion about which is engaged said hollow intermediate member, said pole piece and said intermediate member being secured together as by brazing or welding, said pole piece is provided with an extension which is provided with peripheral screw thread whereby the operator can be secured in a complementarily threaded recess in the fluid control valve.

10. A valve operator as claimed in claim 1 in which said pole piece is provided wth a bore through which can extend an operating rod associated with the armature.

11. A valve operator as claimed in claim 1 in which the armature is of cylindrical form and is provided with axially extending grooves in its peripheral surface.

12. A valve operator as claimed in claim 11 in which the end of the armature presented to the end closure is provided with a recess.

13. A valve operator as claimed in claim 1 in which the armature is of laminated construction.

14. A valve operator as claimed in claim 1 in which the face of the pole piece presented to the armature is provided with a shading ring.

15. A valve operator as claimed in claim 1 which said end closure is integral with said further hollow member.

16. A valve operator as claimed in claim 6 including a spring washer positioned intermediate the cap and the body.

17. A valve operator as claimed in claim 15 including a manually operable member extending through said end closure whereby the armature can be moved manually.

18. A valve operator as claimed in claim 17 in which said manually operable member comprises a pin having a head for engagement with the armature.

19. A valve operator as claimed in claim 18 including a seal member arranged to provide a fluid seal about said pin.

20. A valve operator as claimed in claim 19 including a non-magnetic insert in said end closure, said insert acting to retain said seal member.

21. A valve operator as claimed in claim 1 in which said intermediate member is formed from stainless steel and the pole piece and the further hollow member are formed from silicon steel.

22. A valve operator as claimed in claim 1 in which the pole piece, the intermediate member and the further hollow member are permanently secured together to form the pressure proof compartment with the armature positioned within the compartment.

23. A valve operator as claimed in claim 7 including terminals connected to the ends of said winding said terminals in use, being connectible to an a.c. or a d.c. supply.

24. A valve operator as claimed in claim 23 in which the winding is constructed to be operable on a 24 volt d.c. supply or a 110 volt 50 cycle a.c. supply.

* * * * *